United States Patent
Doucet et al.

(10) Patent No.: US 8,910,083 B2
(45) Date of Patent: Dec. 9, 2014

(54) MULTI-SOURCE PICTURE VIEWER FOR PORTABLE ELECTRONIC DEVICE

(75) Inventors: Heloise Rose Doucet, Ottawa (CA); Daniel Edward Beauregard, Ottawa (CA); Andrew Philip Cundill, Ottawa (CA)

(73) Assignee: Blackberry Limited, Waterloo, Ontario (CA)

( * ) Notice: Subject to any disclaimer, the term of this patent is extended or adjusted under 35 U.S.C. 154(b) by 866 days.

(21) Appl. No.: 12/615,699

(22) Filed: Nov. 10, 2009

(65) Prior Publication Data

US 2011/0113379 A1    May 12, 2011

(51) Int. Cl.
  *G06F 3/0481* (2013.01)
  *G06F 3/0484* (2013.01)

(52) U.S. Cl.
  CPC .. *G06F 3/04845* (2013.01); *G06F 2203/04806* (2013.01)
  USPC ........... 715/838; 715/769; 715/771; 709/203; 709/218; 455/466; 455/418

(58) Field of Classification Search
  USPC ......................................................... 715/838
  See application file for complete search history.

(56) References Cited

U.S. PATENT DOCUMENTS

| 7,017,162 | B2* | 3/2006 | Smith et al. | 719/328 |
| 7,197,531 | B2* | 3/2007 | Anderson | 709/203 |
| 7,673,327 | B1* | 3/2010 | Polis et al. | 726/5 |
| 7,751,807 | B2* | 7/2010 | Lin et al. | 455/418 |
| 2002/0094806 | A1* | 7/2002 | Kamimura | 455/415 |
| 2003/0056204 | A1* | 3/2003 | Broussard | 717/140 |
| 2003/0084120 | A1* | 5/2003 | Egli | 709/218 |
| 2004/0172415 | A1 | 9/2004 | Messina et al. | |
| 2005/0001904 | A1 | 1/2005 | Kiiskinen | |
| 2005/0137015 | A1 | 6/2005 | Rogers et al. | |
| 2005/0250548 | A1* | 11/2005 | White | 455/566 |
| 2006/0095530 | A1* | 5/2006 | Daniell et al. | 709/206 |
| 2007/0094418 | A1* | 4/2007 | Reisman | 710/1 |
| 2007/0100648 | A1 | 5/2007 | Borquez et al. | |
| 2007/0250643 | A1 | 10/2007 | Pyhalammi et al. | |

(Continued)

FOREIGN PATENT DOCUMENTS

| WO | 2008/082794 A2 | 7/2008 |
| WO | 2008100893 A1 | 8/2008 |
| WO | 2009023982 A1 | 2/2009 |
| WO | 2010001182 A2 | 1/2010 |

OTHER PUBLICATIONS

Related European Patent Application No. 11163229.5 Search Report dated Nov. 15, 2011.

(Continued)

*Primary Examiner* — William Bashore
*Assistant Examiner* — Reza Nabi
(74) *Attorney, Agent, or Firm* — Perry + Currier, Inc.

(57) ABSTRACT

A multi-source picture viewer adapted for use within a portable electronic device to view pictures saved on multiple sources, comprising a common graphical user interface for providing picture viewing functionality that is independent of the multiple sources, an optional domain-specific graphical user interface for providing source-related picture viewing functionality that is dependent on the multiple sources, and an image-fetching transport layer for retrieving pictures from the multiple sources and converting the pictures to a common picture model for display on the portable electronic device under control of the common graphical user interface and further manipulation via the domain-specific graphical user interface.

18 Claims, 8 Drawing Sheets

(56) References Cited

U.S. PATENT DOCUMENTS

| | | | |
|---|---|---|---|
| 2007/0300234 A1 | 12/2007 | Dekel et al. | |
| 2008/0108299 A1* | 5/2008 | Hullot et al. | 455/3.01 |
| 2008/0114938 A1 | 5/2008 | Borgendale | |
| 2008/0194276 A1* | 8/2008 | Lin et al. | 455/466 |
| 2008/0195712 A1* | 8/2008 | Lin et al. | 709/206 |
| 2008/0195962 A1* | 8/2008 | Lin et al. | 715/771 |
| 2008/0299997 A1* | 12/2008 | Klassen et al. | 455/466 |
| 2008/0301175 A1 | 12/2008 | Applebaum et al. | |
| 2009/0031232 A1 | 1/2009 | Brezina et al. | |
| 2009/0144639 A1 | 6/2009 | Nims et al. | |
| 2009/0228807 A1 | 9/2009 | Lemay | |
| 2009/0254515 A1* | 10/2009 | Terheggen et al. | 707/2 |
| 2009/0254643 A1* | 10/2009 | Terheggen et al. | 709/223 |
| 2009/0271712 A1 | 10/2009 | Ligh et al. | |
| 2009/0271778 A1 | 10/2009 | Mandyam et al. | |
| 2009/0307603 A1 | 12/2009 | Gowda et al. | |
| 2010/0011422 A1 | 1/2010 | Mason et al. | |
| 2010/0016003 A1* | 1/2010 | Shapiro et al. | 455/466 |
| 2010/0070899 A1* | 3/2010 | Hunt et al. | 715/769 |
| 2010/0106782 A1* | 4/2010 | Huang et al. | 709/206 |
| 2010/0121831 A1 | 5/2010 | Lin et al. | |
| 2010/0125584 A1 | 5/2010 | Navas | |
| 2010/0138371 A1 | 6/2010 | Ishii | |
| 2010/0144328 A1 | 6/2010 | Keating et al. | |
| 2010/0268584 A1* | 10/2010 | Pullur et al. | 705/14.16 |
| 2010/0274847 A1 | 10/2010 | Anderson et al. | |
| 2011/0026704 A1 | 2/2011 | Connelly et al. | |
| 2011/0053578 A1* | 3/2011 | Rochford | 455/418 |
| 2011/0078111 A1 | 3/2011 | Scott et al. | |
| 2011/0087732 A1 | 4/2011 | Lakshmanan et al. | |
| 2011/0125765 A1 | 5/2011 | Tuli | |
| 2011/0173238 A1 | 7/2011 | Griggs | |
| 2011/0197163 A1 | 8/2011 | Jegal et al. | |
| 2011/0227810 A1 | 9/2011 | McKinney et al. | |
| 2011/0238755 A1 | 9/2011 | Khan et al. | |
| 2011/0258016 A1 | 10/2011 | Barak et al. | |
| 2011/0264783 A1* | 10/2011 | Cundill et al. | 709/223 |
| 2011/0321129 A1* | 12/2011 | Kinsel et al. | 726/4 |
| 2013/0127883 A1* | 5/2013 | Mathur et al. | 345/522 |

OTHER PUBLICATIONS

Betadaily.com, Upload Photos and Videos to Multiple Websites At Once From Computer and Mobile Phone, Downloaded from the Internet on Apr. 20, 2010.

Etiole.com, Upload Images to Multiple site at once through PhotoScatter iPhone app, Downloaded from the Internet on Apr. 20, 2010.

Pingfm.pbworks.com, Ping.fm Help and Information Wiki : Posting Photos, Downloaded from the Internet on Apr. 20, 2010.

http://www.svpocketpc.com/reviews/listpro4/ListPro4.html, Downloaded from the Internet on May 25, 2011.

http://media.wbpsystems.com/torch_mobile_book.pdf, Downloaded from the Internet on Jun. 2, 2011.

http://duncsweb.com/2009/12/07/review-snaptu-twitter-facebook-rss-google-calendar-flickr-tv-movies-picasa-more-on-your-mobile-device/, Downloaded from the Inernet on Jun. 2, 2011.

http://www.macworld.com/appguide/app.html?id=86956, Downloaded from the Internet on Jun. 2, 2011.

http://www.makeuseof.com/dir/combine-multiple-feeds/, Downloaded from the Internet on Jun. 2, 2011.

http://mobile.engadget.com/2009/03/23/socialscope-for-blackberry-impressions-and-invites/, Downloaded from the Internet on May 25, 2011.

http://mashable.com/2008/07/15/twhirl-tweetdeck-comparison/, Downloaded from the Internet on May 25, 2011.

http://en.wikipedia.org/wiki/Ping.fm, Downloaded from the Internet on May 25, 2011.

http://mashable.com/2009/08/05/twitter-blackberry-clients/ Ubertwitter, Downloaded from the Internet on May 25, 2011.

http://www.ifreeware.net/download-listening-to--share-what-you-are-listening-to-on-facebook-twitter.html, Downloaded from the Internet on Mar. 13, 2011.

Seesmic for iPhone, http://blog.seesmic.com/2010/05/introducing-seesmic-for-iphone-1.html, Downloaded from the internet on Mar. 13, 2011.

http://www.twitip.com/manage-your-messages-on-dozens-of-social-networking-serviced-at-once-with-pingfm/, Downloaded from the Internet on Mar. 13, 2011.

Atomkeep syncs profile information across multiple services, Downloaded from the Internet on Apr. 20, 2010.

Technotraits.com, 7+ Websites That Upload Files to Multiple File sharing Sites At Once, Downloaded from the Internet on Apr. 20, 2010.

Blogsdna.com, TubeMogul Lets You to Upload Videos to Multiple Video sharing Websites in One Shot, Downloaded from the Internet on Apr. 20, 2010.

Ubergizmo.com, JOGGLE: Manage Your Media Files Across Multiple Devices and Websites, Downoaded from the Internet on Apr. 20, 2010.

European Patent Application No. 09175613.0 Search Report dated May 21, 2010.

Related European Patent Application No. 11163220.4 Search Report dated Dec. 20, 2011.

HootSuite: "HootSuite iPhone App", YouTube Website, Dec. 3, 2009, XP002659577, Retrieved from the Internet: URL:http://www.youtube.com/watch?v=-YwC3PX8_Ns&feature=player_embedded.

Chris Trottier: "Announcing HootSuite for iPhone", HootSuite Blog, Dec. 9, 2009, XP002659576, Retrieved from the Internet: URL:http://blog.hootsuite.com/announcing-hootsuite-for-iphone/ [retrieved on Sep. 21, 2011.

Krista Graham: "TechMatters: Hear the Librarian Go Tweet, Tweet, Tweet: Beyond the Basics (Part II)", LOEX Clearinghouse for Library Instruction, vol. 36, No. 4, Feb. 1, 2010, pp. 6-7, 10, XP002659664.

Jegal et al., U.S. Appl. No. 61/303,505, filed Feb. 11, 2010.

Amit Agarwal. "Publish the Same Blog Post to Multiple Blogging sites at Once", publicly available on Nov. 14, 2008.

Related U.S. Appl. No. 13/091,812 Office Action dated Mar. 21, 2013.

Related U.S. Appl. No. 13/090,464 Office Action dated Mar. 28, 2013.

* cited by examiner

MULTI-SOURCE PICTURE VIEWER FOR PORTABLE ELECTRONIC DEVICE

FIELD

The present disclosure relates generally to portable electronic devices and more particularly to a multi-source picture viewer adapted for use within a portable electronic device for viewing images received from multiple sources via a common user interface.

BACKGROUND

Portable electronic devices, such as traditional personal digital assistants ("PDAs"), smartphones, mobile multimedia players, etc., often incorporate applications for viewing images such as pictures stored in an image or graphics format (e.g. attachment viewer, browser, picture viewer, etc.) When the images to be viewed originate from multiple sources (e.g. local SD memory card, Flickr® account, Picasa® account, computer desktop, Unite!™ server, etc.), a user typically either uses specific "thin" client applications to view the pictures (e.g. Moblica Picasa®, JiveSlide™, Yahoo® Go!, etc.) or synchronize pictures with a computer desktop (e.g. SplashPhoto™, Ascendo™, MobiPhoto™, etc.), or manually copies the images from the multiple source locations/providers to local device memory or SD memory card prior to viewing the images on the device. Switching between multiple specific client applications in order to view pictures is time consuming and potentially confusing for users, while copying from the image source locations/providers to local memory is also time consuming and may present the user with certain challenges in terms of reducing image size for display on the device, choosing a memory storage location/folder to save the images, synchronizing the device with new images, etc. Also, the lack of a common application user interface for downloading, viewing and performing operations on the images (e.g. tagging, searching, emailing, etc.) may further complicate the user picture viewing experience.

Patent publications that are relevant to this specification include U.S. Pat. No. 7,197,531 (Anderson), US Patent Publication No. 2005/0250548 (White), and the following patent publications of Lin et al: US Patent Publication Nos. 2008/0195962, 2008/0195712, 2008/0194276 and WO 2008/100893. Anderson discloses a method and system for integrating web photo-services for a browser-enabled device using a gateway server with software on the client device that reports the contents of the device to the gateway server. White discloses an image browser for a phone that connects to a single image server and allows a user to tag a picture for performance of another action (e.g. e-mail, MMS). Lin et al disclose a web site to manage multimedia data and a thin client application on a mobile device that runs in the background to process synchronization requests received from the server, wherein the server manages activities made by a user on the web site.

Relevant non-patent prior art includes Portable Universal Viewer Pro by Softoogle and Universal Viewer by UVWiewsoft, which support viewing multiple file formats but do not support viewing images from multiple sources, as well as GooglePreview and CoolPreviews by Mozilla.

BRIEF DESCRIPTION OF THE DRAWINGS

Embodiments, which are purely exemplary, will now be discussed with reference to the attached Figures in which.

DETAILED DESCRIPTION OF THE EMBODIMENTS

As discussed in greater detail below, according to an aspect of this specification there is provided a multi-source picture viewer adapted for use within a portable electronic device to view pictures saved on multiple sources, comprising a common graphical user interface for providing picture viewing functionality; and an image-fetching transport layer in communication with said common graphical user interface for retrieving said pictures from said multiple sources and converting said pictures to a common picture model for display on said portable electronic device under control of said common graphical user interface.

According to another aspect, there is provided a portable electronic device comprising at least one user input device for initiating commands to view pictures saved on multiple sources; a display; a persistent storage device; and a processor interconnecting said user input device, display and persistent storage device, for implementing a multi-source picture viewer having a common graphical user interface for providing picture viewing functionality in conjunction with said user input device and display; and an image-fetching transport layer in communication with said common graphical user interface for retrieving said pictures from said multiple sources and converting said pictures to a common picture model for presentation on said display under control of said common graphical user interface.

According to a further aspect, there is provided a method for use within a portable electronic device to view pictures saved on multiple sources, comprising providing a common graphical user interface for providing picture viewing functionality; and retrieving said pictures from said multiple sources and converting said pictures to a common picture model for display on said portable electronic device under control of said common graphical user interface.

Figure 1:
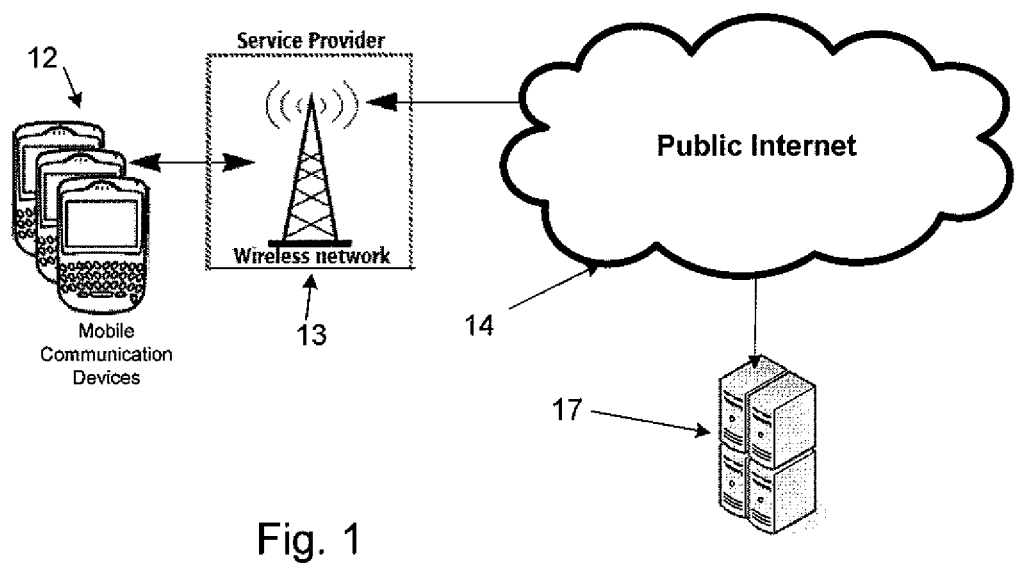
FIG. 1 is a schematic representation of a wireless communication system for retrieving pictures from multiple sources.

Reference is first made to the communication architecture shown in FIG. 1. A plurality of portable electronic devices 12 are shown communicating over a wireless network 13 and the Internet 14 with multiple servers 17, which function as sources/locations of picture data, such as a Flickr® server, Moblica Picasa® server, JiveSlide™ server, Photobucket® server, etc.) The portable electronic devices 12 are based on the computing environment and functionality of a wireless personal digital assistant. It is, however, to be understood that devices 12 can include the construction and functionality of other electronic devices, such as cell phones, smart telephones, multimedia players, and the like. As would be understood by one of ordinary skill in the art, wireless network 13 may be a GSM/GPRS, Cellular Digital Packet Data (CDPD), Time Division Multiple Access (TDMA), iDEN Mobitex, DataTAC network, EDGE or UMTS, or a broadband network such as Bluetooth or variants of 802.11. A person of skill in the art will understand that the servers 17 provide access to picture files such as Joint Photographic Experts Group (JPEG), Tagged Image File Format (TIFF), bitmap (BMP), Portable Network Graphics (PNG), Moving Picture Experts Group (MPEG-4), Moving JPEG (MOV), Graphics Interchange Format (GIF), Scalable Vector Graphics (SVG), etc. For the purpose of this specification, the word "pictures" is used to mean images saved according to any of the electronic file formats set forth above as well as future image file formats not yet in existence.

Figure 2:
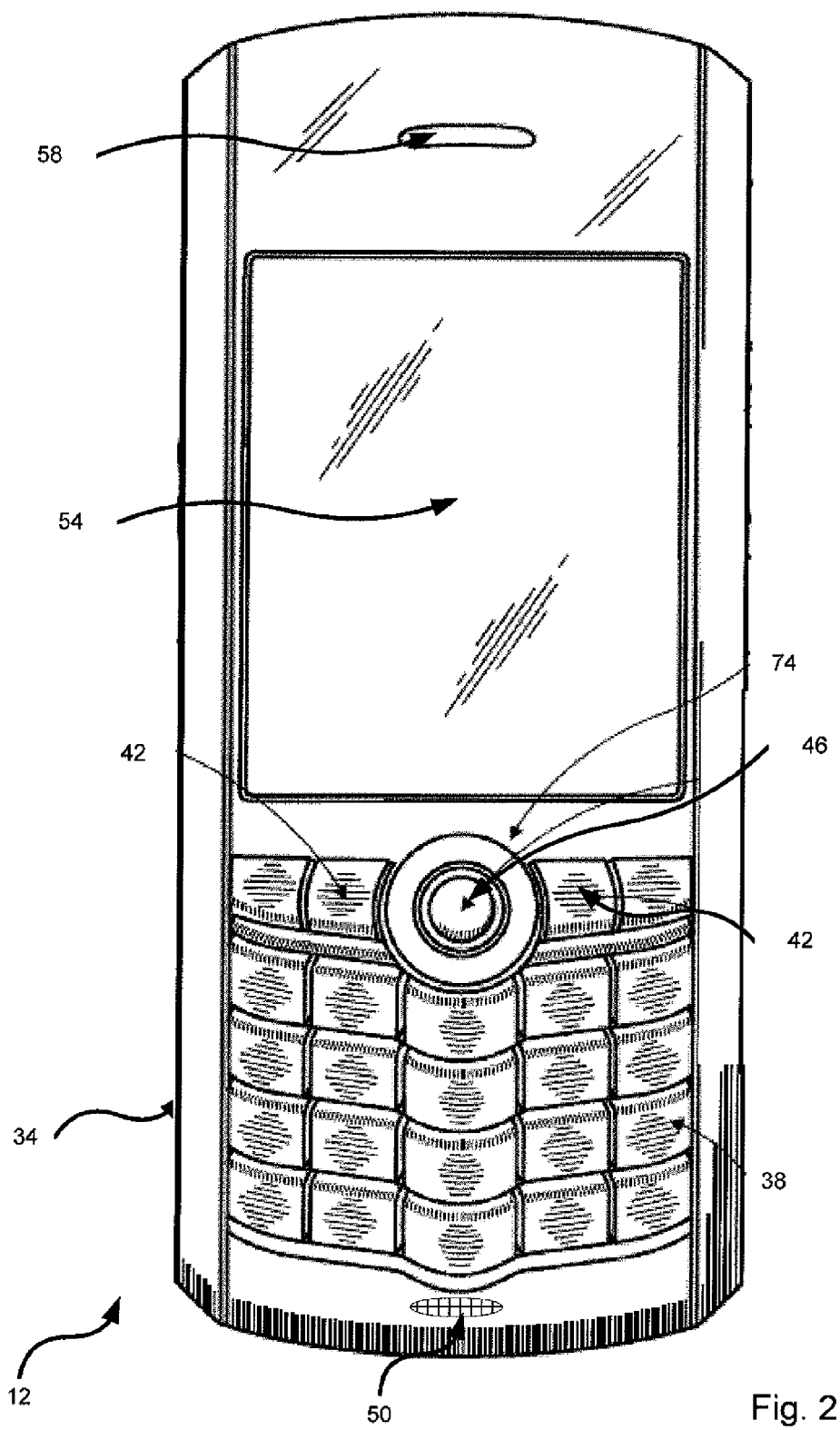
FIG. 2 is a schematic representation of a front view of a portable electronic device in accordance with an embodiment.

Referring now to FIG. 2, a front view of a portable electronic device 12 in accordance with an embodiment includes a housing 34 that frames a plurality of input devices in the form of a keyboard 38, a set of keys 42 (one of which may be a menu key), a trackball 46 (or other input device, such as a touch screen or touch pad), and a microphone 50. Housing 34 also frames a plurality of output devices in the form of a display 54 and a speaker 58.

Accordingly, a user of device 12 can interact with the input devices and output devices to send and receive emails, conduct voice telephone calls, manage appointments and contacts, browse the Internet, view pictures, play multimedia files and perform such other functions as can be found on a known or as-yet unconceived electronic device such as device 12.

It is to be understood that device 12 is simplified for purposes of explanation, and that in other embodiments device 12 can include, additional and/or different functions and/or applications, and include input and output devices accordingly (e.g. audio recording, camera, etc.) An example of a combined input/output device would include a Universal Serial Bus ("USB") port, a headset jack to connect a hands-free headset to device 12, or a Bluetooth™ (or equivalent technology) transceiver. Likewise, it will be understood from the teachings herein that certain functions included in device 12 can be omitted.

In one embodiment, the form factor of device 12 is constructed so that a user can grasp device 12 with either a left hand, or right hand, and be able to activate keys 42 and trackball 46 with the thumb. (While trackball 46 is configured for the thumb, it should be understood that users can use other digits on their hands as well).

Figure 3:
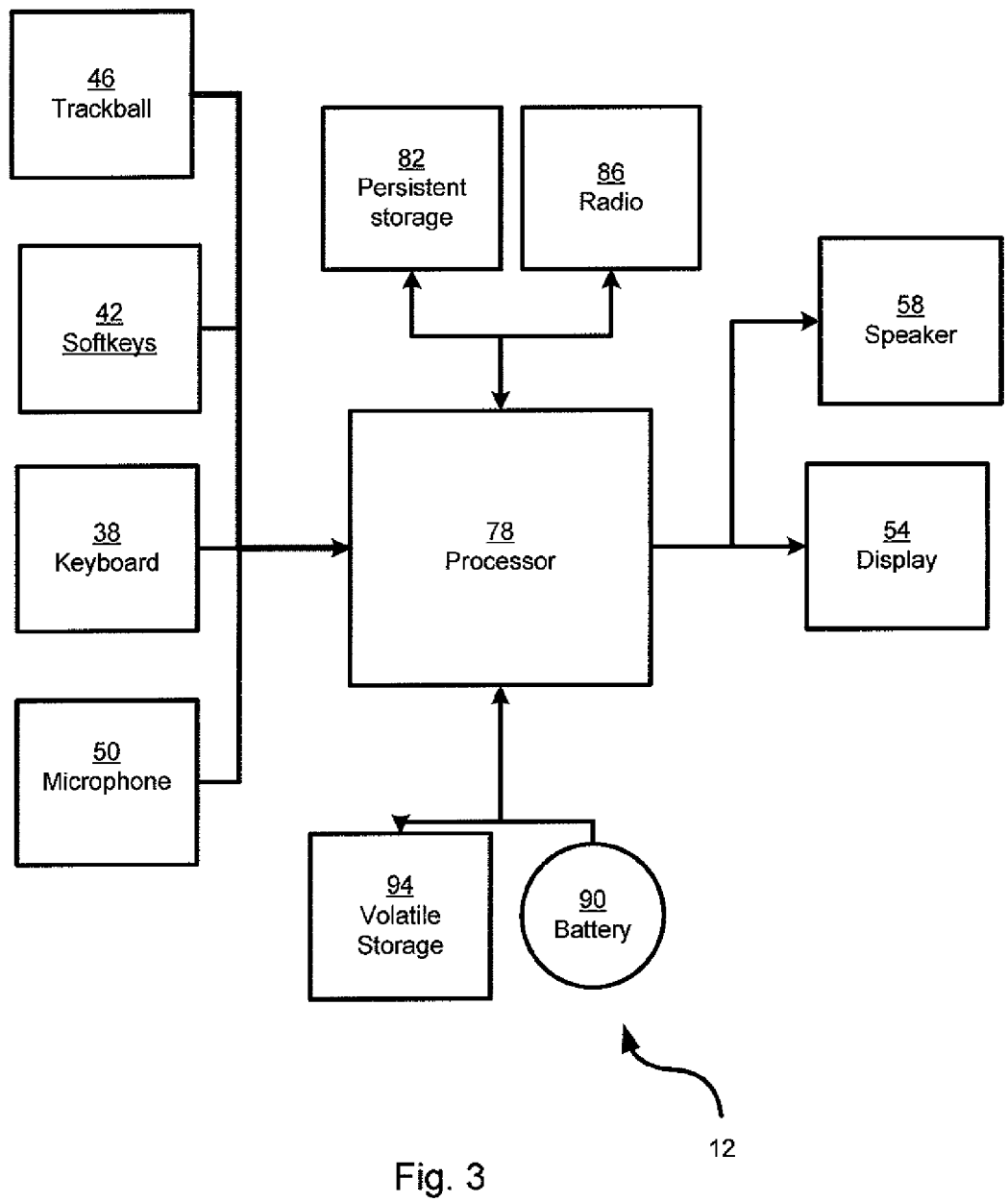
FIG. 3 is a block diagram of certain internal components of the device of FIG. 2.

Referring now to FIG. 3, a block diagram representing certain internal components of device 12 is shown. Device 12 thus includes a processor 78 which interconnects the input devices of device 12 (i.e. trackball 46, keys 42, keyboard 38, and microphone 50) and the output devices of device 12 (i.e. speaker 58 and display 54). Processor 78 is also connected to a persistent storage device 82. (Persistent storage device 82 can be implemented using flash memory or the like, such as an SD card, and/or can include other programmable read only memory (PROM) technology and/or can include read-only memory (ROM) technology and/or can include a removable "smart card" and/or can be comprised of combinations of the foregoing.) As discussed in greater detail below, processor 78 executes a plurality of applications stored in persistent storage device 82, such as the picture viewer application of an exemplary embodiment, and other applications that will be known to a person of skill in the art such as an email application, telephony application, Web-browsing application calendar application, contacts application, etc.

Device 12 also includes a wireless radio 86 disposed within housing 34 that connects wirelessly to one of a network of base stations to provide the wireless access via wireless network 13 to pictures stored on multiple servers 17, as well as email, telephony and Web-browsing application functionality referred to above.

Device 12 also includes a battery 90 which is typically rechargeable and provides power to the components of device 12. In a present, purely exemplary embodiment, battery 66 is a lithium battery having an operating voltage of between about 3.0 Volts minimum to about 4.2 Volts maximum. In FIG. 3, for simplicity battery 90 is only shown connected to processor 78, but it will be understood that battery 90 is connected to any component (e.g. radio 88, display 54, etc.) within device 12 that needs power to operate.

Device 12 also includes volatile storage 94, which can be implemented as random access memory (RAM), which can be used to temporarily store applications and data as they are being used by processor 78.

As discussed above, in accordance with an exemplary embodiment processor 78 executes a multi-source picture viewer application stored in persistent storage device 82 for providing a unified picture browsing and management function with a common interface for viewing pictures as well as performing common image related operations such as uploading, tagging, searching, emailing, etc.

Figure 4:
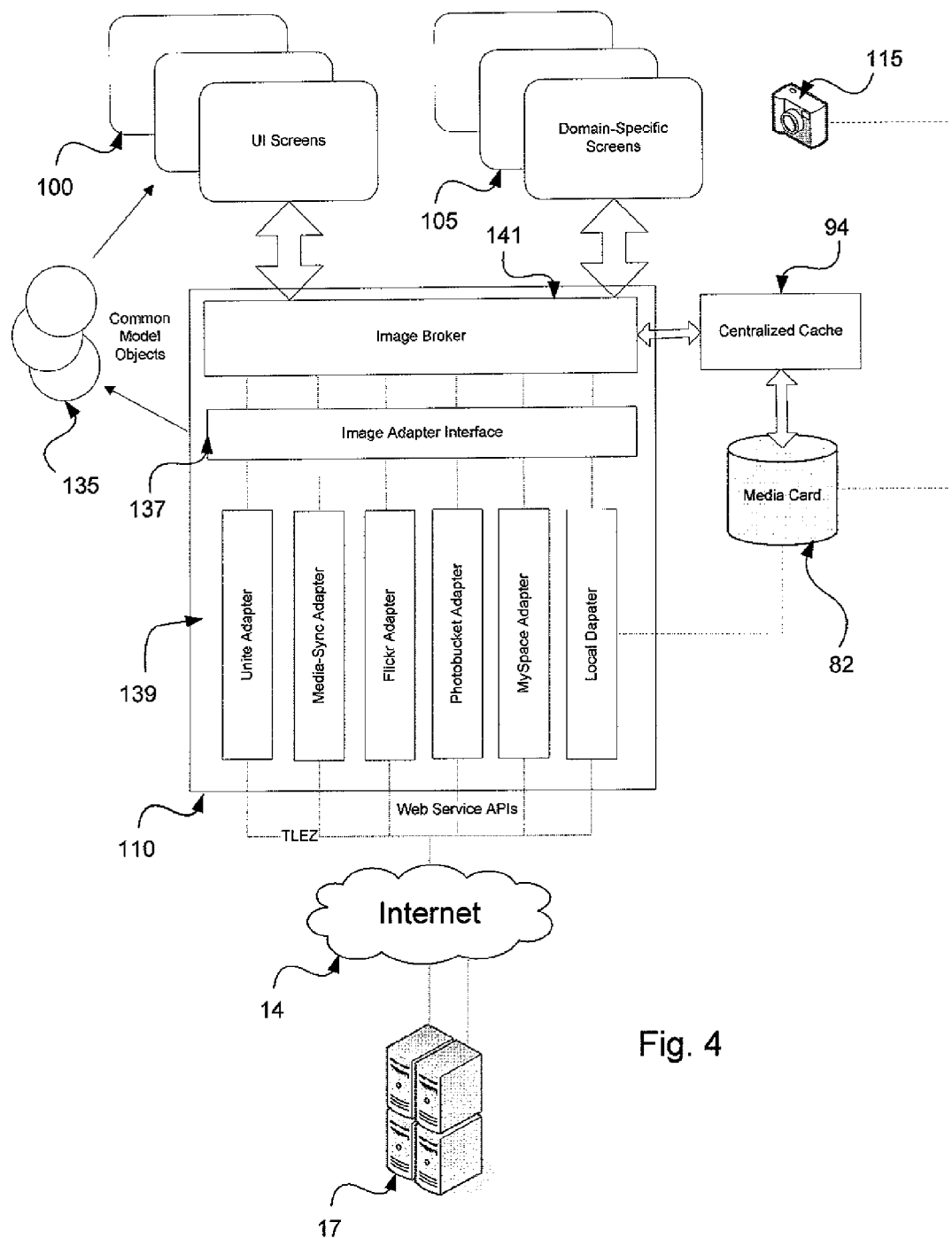
FIG. 4 is a block diagram of components of a picture viewer application of the device of FIG. 2, according to an exemplary embodiment.

Referring now to FIG. 4, a pluggable architecture is illustrated for the picture viewer application according to the exemplary embodiment. The structure of the picture viewer application is divided into three functional layers: common graphical user interfaces 100, an optional domain-specific (or source-related) graphical user interfaces 105, and an image-fetching transport layer 110.

The common graphical user interfaces 100 provide functionality that is independent (decoupled) from the interface (protocol, transport and APIs) used to communicate with the picture sources, and generates navigable user screens for browsing the contents of picture folders/albums on the device 12, including thumbnails and full-screen images. The optional domain-specific graphical user interfaces 105 provide a common interface for additional source-related functions such as uploading, tagging, searching, and emailing of pictures. The image-fetching transport layer 110 provides an infrastructure to enable the pluggable domain-specific graphical user interfaces 105 to be added, and source-specific picture viewing functionality, such as tagging a picture in Facebook®, or setting access permissions on a Flickr® photoset, as well as retrieving image data (pictures) from the multiple external sources 17 and local sources such as media SD card 82, and temporarily caching the pictures in volatile storage 94 for immediate viewing or storage in SD card 82 via common graphical user interface 100 or further manipulation via optional domain-specific graphical user interface 105. In one embodiment, photos taken by a camera 115, which may be an external camera or may be incorporated into the device 12, are stored in SD card 82 as a local source of pictures for the picture viewer application.

More particularly, image-fetching transport layer 110 includes a common image adapter interface 137 for multiple adapter classes 139 that use respective source-specific transport mechanisms to retrieve pictures from the multiple sources 17 or local source 82 and an image broker 141 (i.e. mediation layer) to map the retrieved pictures to common model objects 135 and perform common create, read, update and delete (CRUD) functions of persistent storage. In the illustrated embodiment, exemplary plug-in adapters are shown such as a Flickr® adapter, Unite!™ adapter, Media-Sync adapter, Photobucket® adapter, Myspace® adapter, and a local adapter. Additional adapter classes can be added to the device 12 without recompilation/re-deployment of the picture viewer application by adding an installation file (e.g. a .cod file) that registers itself with the device 12 as a photo/picture source so that it can be detected when running the picture viewer application.

Figure 5:
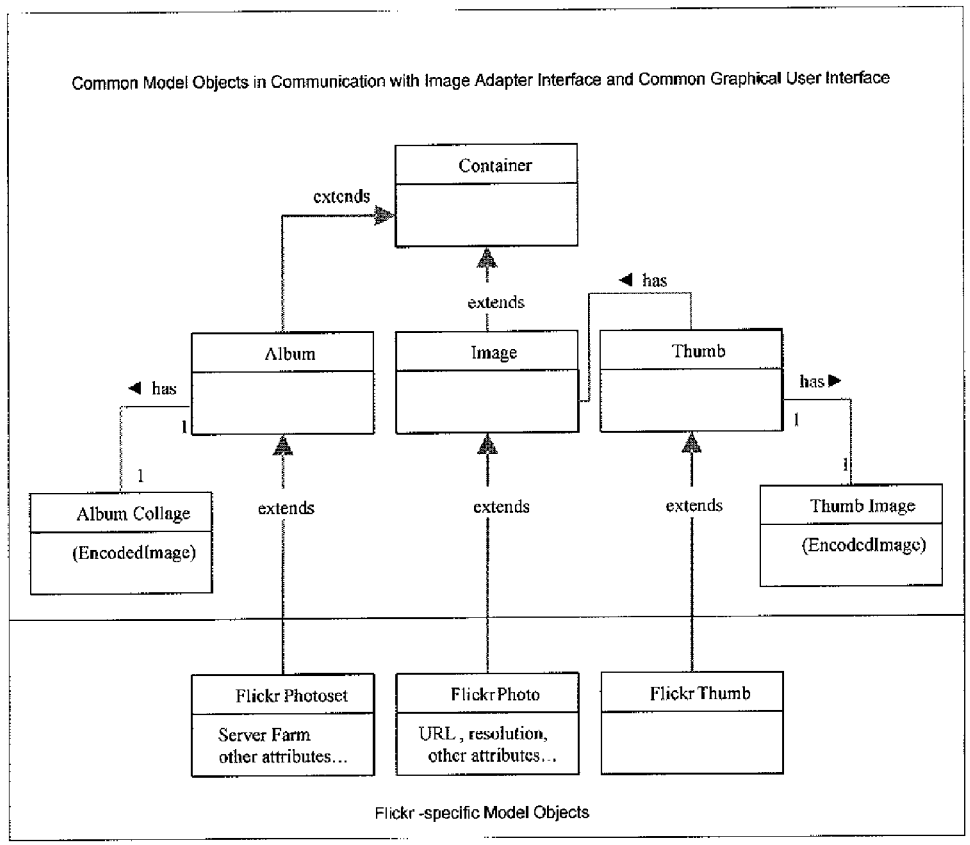
FIG. 5 is a simplified UML representation of a common model object of the picture viewer of FIG. 4.
Figure 7:
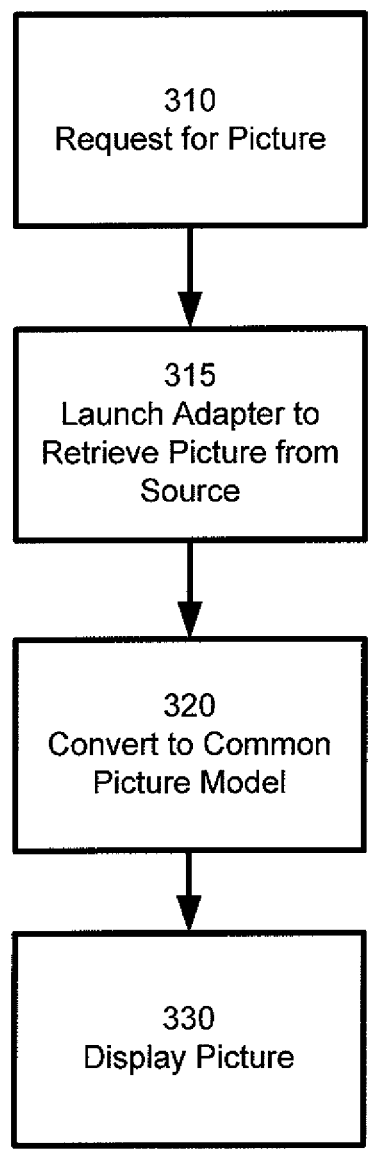
FIG. 7 is a flowchart depicting a method of downloading and displaying a picture from a source, according to an embodiment.

The common model objects 135 comprise common objects such as Albums, Images and Thumbs, and data that define the relationships between the common objects. Domain-specific sub-classes of the common objects enable the same objects to have meaning in a common (normalized) context as well as in a domain-specific context. A simplified UML representation is provided in FIG. 5 showing Album, Image and Thumb common models extended by the Flickr Adapter. In the example of FIG. 7, a Flickr® Photoset object is understood merely as an "Album" in the common model context, but when passed back to the Flickr® adapter in an image-retrieval request, the adapter extracts the server-farm, URL, credentials, and other pertinent information.

From the foregoing, it will be appreciated that no intermediate gateway server is required for processing picture images defined by the common model objects 135, although it is possible within the exemplary embodiment to provide an adapter that uses such a gateway. Instead, each adapter communicates directly with an associated source server 17 and the device 12 processes the images locally for presentation on display 54, storage in a photo album, etc.

Figure 6:
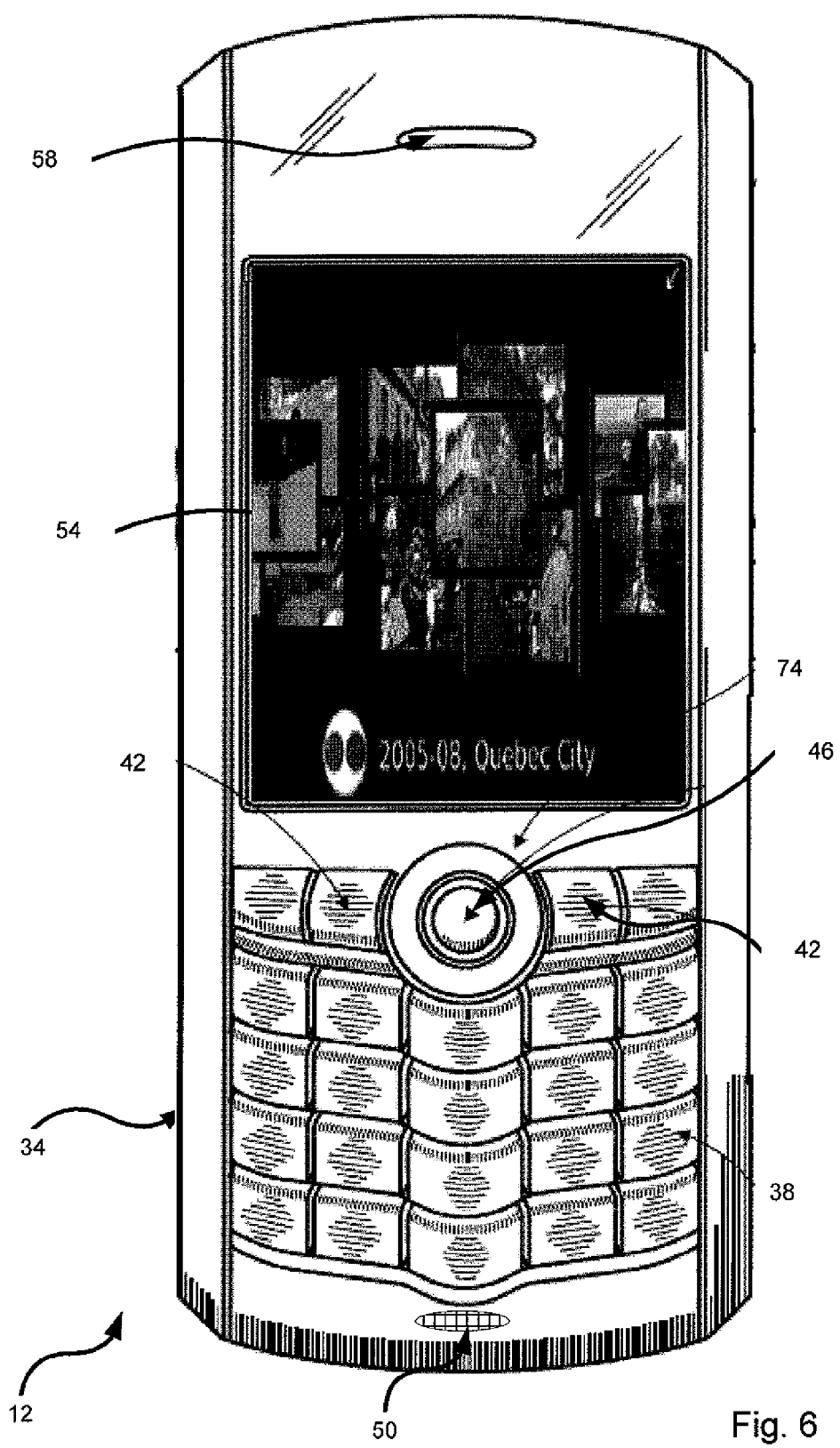
FIG. 6 is a schematic representation of a front view of the portable electronic device of FIG. 2 displaying a set or album of pictures downloaded from a source using the picture viewer application of FIG. 4.

FIG. 6 depicts the portable electronic device of FIG. 2, displaying a set or album (i.e. 2005-08, Quebec City) of pictures retrieved from a Flickr® account (denoted by the icon appearing adjacent the album/folder name) using the Flick® adapter 139 of image-fetching transport layer 110.

A representative method of retrieving and viewing pictures from multiple sources 17, is depicted in FIG. 7. To assist in understanding the representative method, the method will be explained in terms of its performance using device 12. However, it is to be understood that this discussion is not to be construed in a limiting sense, and that the method can be performed on devices other than device 12, and/or that the method can be varied.

Beginning at step 310, a request is generated for a picture from a specific source 17 (e.g. local SD memory card, Flickr® account, Picasa® account, computer desktop, Unite!™ server, etc.), using menu prompts or other interface functions of the common graphical user interface 100 under control of the image broker 141. The image-fetching transport layer 110 then launches the appropriate adapter 139 at step 315 which communicates with its associated source 17 according to the data model and defined APIs or protocols (e.g. as discussed in connection with FIG. 5) for accessing functionality of the source 17 to retrieve the requested picture and, at step 320, communicates with the image broker 141 to convert from the data and service format of the source 17 to the common model object 135, and the common graphical user interface 100 then caches and displays the downloaded picture step 330. Thereafter, the picture may be stored in non-volatile device memory, such as media SD card 82, or otherwise manipulated.

In terms of manipulating pictures, certain operations are common device operations invoked from the common graphical user interfaces 100 (e.g. set as wallpaper, set as caller ID, zoom in, etc.), whereas others are source-specific operations that require the associated adapter 139 to perform operations on the picture source. For example, the operation of emailing pictures is common (and thus exposed via the common UI 100) but domain specific. For example, pictures stored on the device (e.g. persistent storage 82) may be emailed directly from the device 12, whereas pictures stored remotely on a Unite server can be emailed directly from the Unite Server to an intended recipient in response to instructions from the Unite Adapter 139, and the adapters 139 for photo-sharing and social-networking websites (e.g. Flickr®, Photobucket®, MySpace®, FaceBook®) may email a URL to a recipient to view the pictures directly on the associated website. In addition, optional domain-specific graphical user interfaces 105 may be provided by the adapters, launched from one of the menu verbs provided by an adapter to a common UI screen 100 that then implements any desired domain-specific functionality.

Figure 8:
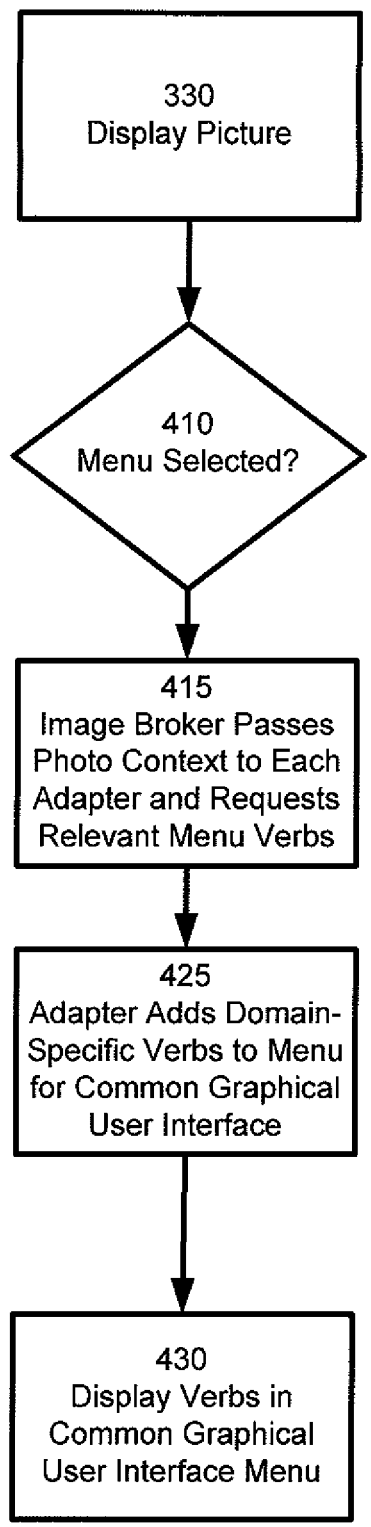
FIG. 8 is a flowchart depicting a method of performing a source-related action on a downloaded picture, according to an embodiment.

FIG. 8 depicts steps for implementing domain-specific functionality according to one example (pictures in a Flickr® account). At step 330, the picture is displayed (see FIG. 6). In response to activation of menu key 42 (step 410), the image broker 141 passes data indicating the photo context (e.g. an array of Image or Album model objects) to each of the adapters 139 (step 415). In response, each adapter 139 provides menu verbs based on the photo context (step 430), such as whether the context is an Album, an Image or multiple images. For example in response to the Flickr® adapter receiving a request to provide menu verbs where the photo context is "Image" and that was originally created (i.e. was the source of) as a flickr photo (i.e. the photo was sourced by the Flickr adapter), then the Flickr adapter provides menu verbs for emailing, renaming, tagging, deleting, adding comment, etc. On the other hand if the photo came from a different adapter, the Flickr adapter provides the appropriate context-specific verbs as menu options (e.g. "Upload to Flickr").

The foregoing represents exemplary embodiments only. Other embodiments and variations are contemplated. For example, it is contemplated that the structure and operation of the exemplary picture viewer application may be modified or extended to other media such as video, audio, etc. These and other embodiments are believed to be within the scope of the claims attached hereto.

The invention claimed is:

1. A non-transitory computer-readable medium storing a multi-source picture viewer application executable by a processor of a portable electronic device to view pictures saved on multiple sources, said application comprising:
 a common graphical user interface for providing picture viewing functionality; and
 an image-fetching transport layer in communication with said common graphical user interface, said image-fetching transport layer including:
  a plurality of adapters, each adapter for retrieving said pictures from a different one of said multiple sources;
  an image broker for converting said retrieved pictures to common picture model objects having album, image, and thumbnail image classes for display on said portable electronic device under control of said common graphical user interface, said common picture model objects further having one or more subclasses for use by said adapters in communicating with said multiple sources;
 said image broker configured to persist said pictures to storage in said portable electronic device; and
  a common image adapter interface for connecting said plurality of adapters and said image broker.

2. The non-transitory computer-readable medium of claim 1, wherein the picture viewing functionality of said common graphical user interface includes at least one of generating navigable user screens for browsing thumbnails and full-screen images of pictures on said portable electronic device, setting as wallpaper, setting as caller ID and zooming in.

3. The non-transitory computer-readable medium of claim 1, said multi-source picture viewer application further comprising a domain-specific graphical user interface for each of said multiple sources in communication with said image-fetching transport layer for providing source-related picture viewing functionality.

4. The non-transitory computer-readable medium of claim 3, wherein the picture viewing functionality of said domain-specific graphical user interface includes at least one of emailing, renaming, tagging and deleting.

5. The non-transitory computer-readable medium of claim 1, wherein at least one of said plurality of plug-in adapters communicates remotely with a respective one of said multiple sources over a communication network.

6. The non-transitory computer-readable medium of claim 1, wherein at least one of said plurality of plug-in adapters communicates locally with a respective one of said multiple sources.

7. A portable electronic device comprising:
   at least one user input device for initiating commands to view pictures saved on multiple sources;
   a display;
   a persistent storage device; and
   a processor interconnecting said user input device, display and persistent storage device, for implementing a multi-source picture viewer having a common graphical user interface for providing picture viewing functionality in conjunction with said user input device and display; and
   an image-fetching transport layer in communication with said common graphical user interface, said image-fetching transport layer including:
      a plurality of adapters, each adapter for retrieving said pictures from a different one of said multiple sources; and
      an image broker for converting said retrieved pictures to common picture model objects having album, image, and thumbnail image classes for presentation on said display under control of said common graphical user interface, said common picture model objects further having one or more subclasses for use by said adapters in communicating with said multiple sources; said image broker configured to persist said pictures to said persistent storage device; and
      a common image adapter interface for connecting said multiple adapters and said image broker.

8. The portable electronic device of claim 7, wherein the picture viewing functionality of said common graphical user interface includes at least one of generating navigable user screens for browsing thumbnails and full-screen images of pictures on said portable electronic device, setting as wallpaper, setting as caller ID and zooming in.

9. The portable electronic device of claim 7, further including a domain-specific graphical user interface in communication with said image-fetching transport layer, said user input device and said display for providing source-related picture viewing functionality.

10. The portable electronic device of claim 9, wherein the picture viewing functionality of said domain-specific graphical user interface includes at least one of emailing, renaming, tagging and deleting.

11. The portable electronic device of claim 7, wherein at least one of said plurality of plug-in adapters communicates remotely with a respective one of said multiple sources over a communication network.

12. The portable electronic device of claim 7, wherein at least one of said plurality of plug-in adapters communicates locally with a respective one of said multiple sources.

13. A method for use within a portable electronic device to view pictures saved on multiple sources, comprising:
   providing a common graphical user interface for providing picture viewing functionality; and
   retrieving said pictures from said multiple sources using a plurality of adapters, each adapter for retrieving said pictures from a different one of said multiple sources; and
   converting said pictures, using an image broker, to common picture model objects having album, image, and thumbnail image classes for display on said portable electronic device under control of said common graphical user interface, said common picture model objects further having one or more subclasses for use by said adapters in communicating with said multiple sources; and
   persisting said pictures to storage in said portable electronic device using said image broker.

14. The method of claim 13, wherein the picture viewing functionality of said common graphical user interface includes at least one of generating navigable user screens for browsing thumbnails and full-screen images of pictures on said portable electronic device, setting as wallpaper, setting as caller ID and zooming in.

15. The method of claim 13, further including providing a domain-specific graphical user interface for providing source-related picture viewing functionality.

16. The method of claim 15, wherein the picture viewing functionality of said domain-specific graphical user interface includes emailing, renaming, tagging and deleting.

17. The method of claim 13, further comprising communicating remotely with at least one of said multiple sources over a communication network.

18. The method of claim 13, further comprising communicating locally with at least one of said multiple sources.

* * * * *